(12) United States Patent
Kim

(10) Patent No.: US 10,725,702 B2
(45) Date of Patent: Jul. 28, 2020

(54) MEMORY SYSTEM AND METHOD OF OPERATING THE SAME

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 92 days.

(21) Appl. No.: 16/121,041

(22) Filed: Sep. 4, 2018

(65) Prior Publication Data

US 2019/0250856 A1    Aug. 15, 2019

(30) Foreign Application Priority Data

Feb. 13, 2018  (KR) .................. 10-2018-0017482

(51) Int. Cl.
*G06F 12/123*    (2016.01)
*G06F 3/06*    (2006.01)

(52) U.S. Cl.
CPC .......... *G06F 3/0659* (2013.01); *G06F 3/0611* (2013.01); *G06F 3/0673* (2013.01)

(58) Field of Classification Search
CPC .............................. G06F 3/0659; G06F 12/123
USPC ........................................................ 711/158
See application file for complete search history.

(56) References Cited

U.S. PATENT DOCUMENTS

2011/0131385 A1* 6/2011 Henriksson ......... G06F 13/1642
711/158

FOREIGN PATENT DOCUMENTS

KR    1020170099618    9/2017

* cited by examiner

*Primary Examiner* — Jae U Yu
(74) *Attorney, Agent, or Firm* — IP & T Group LLP

(57) ABSTRACT

Provided herein may be a memory system and a method of operating the memory system. The memory system may include a memory device configured to perform read operations and write operations, and a controller configured to control the memory device such that tasks received from a host are queued based on priorities thereof, and the read operations or the write operations corresponding to the tasks are executed according to a sequence of the queued tasks. The controller may divide the plurality of tasks into a plurality of types, assign different aging weights to the queued tasks depending on the respective types, accumulate an aging weight of an executed task of the queued tasks to a starvation state determination value of each of residual tasks of the queued tasks, and determine whether each of the residual tasks is in a starvation state using the corresponding starvation state determination value.

20 Claims, 7 Drawing Sheets

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2018-0017482, filed on Feb. 13, 2018, which is incorporated herein by reference in its entirety.

BACKGROUND

1. Field of Invention

Various embodiments of the present disclosure generally relate to a memory system and a method of operating the memory system. Particularly, the embodiments relate to a memory system capable of preventing tasks from being in a starvation state, and a method of operating the memory system.

2. Description of Related Art

The computing environment paradigm has shifted to ubiquitous computing, which enables computer systems to be used anytime and anywhere. As a result, the use of portable electronic devices such as mobile phones, digital cameras, and laptop computers has rapidly increased. In general, such portable electronic devices use a memory system which employs a memory device, in other words, use a data storage device. The data storage device is used as a main memory device or an auxiliary memory device of the portable electronic devices.

Since there is no mechanical driving part, a data storage device using a memory device provides advantages such as excellent stability and durability, high information access speed, and low power consumption. A data storage device, as an example of a memory system having such advantages, may include a universal serial bus (USB) memory device, a memory card having various interfaces, and a solid state drive (SSD).

SUMMARY

Various embodiments of the present disclosure are directed to a memory system which divides a plurality of tasks into a read task and a write task, and sets different aging weights to the read task and the write task for starvation states, and a method of operating the memory system.

An embodiment of the present disclosure may provide for a memory system including: a memory device configured to perform read operations and write operations; and a controller configured to control the memory device such that a plurality of tasks received from a host are queued based on priorities of the tasks, and the read operations or the write operations corresponding to the tasks are executed according to a sequence of the queued tasks. The controller may divide the plurality of tasks into a plurality of types, assign different aging weights to the queued tasks depending on the respective type, accumulate an aging weight of an executed task of the queued tasks to a starvation state determination value of each of residual tasks of the queued tasks, and determine whether each of the residual tasks is in a starvation state using the corresponding starvation state determination value.

An embodiment of the present disclosure may provide for a method of operating a memory system, including: receiving a command from a host; determining whether the command is a read command or a write command, and assigning, depending on whether the command is the read command or the write command, a corresponding aging weight to a plurality of tasks in the command; queuing the plurality of tasks based on priorities of the tasks, and sequentially performing operations corresponding to the plurality of tasks according to a sequence of the queued tasks; accumulating, when an operation corresponding to one of the plurality of tasks is completed, an aging weight corresponding to the one task to a starvation state determination value of each of residual tasks of the queued tasks; and determining that a task, the accumulated starvation state determination value of which is detected to be a predetermined value or more, is an urgent task, and preferentially executing the urgent task.

An embodiment of the present disclosure may provide for a memory system including: a memory device; a controller configured to: rearrange and queue a plurality of tasks according to priorities thereof, the tasks having aging weights according to types thereof; control the memory device to perform operations according to the queued tasks; and accumulate the aging weight of a task, among the plurality of tasks, for which a corresponding operation is completed, to each remaining queued task, wherein the controller controls the memory device to preferentially perform an operation corresponding to a task, among the remaining queued tasks, that has an accumulated aging weight greater than a threshold.

DETAILED DESCRIPTION

Figure 1:
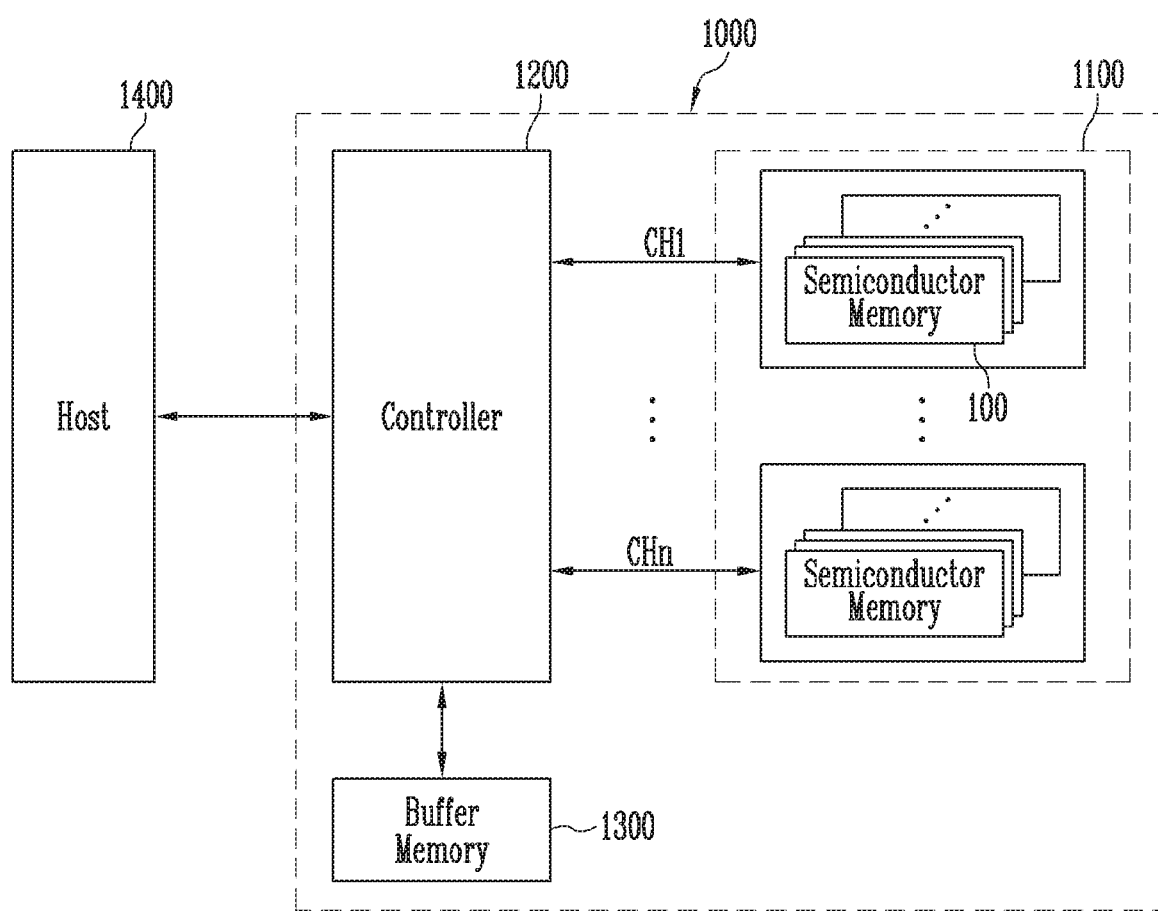
FIG. 1 is a block diagram illustrating a memory system in accordance with an embodiment of the present disclosure.

Various embodiments will now be described more fully with reference to the accompanying drawings; however, elements and features of the present disclosure may be configured or arranged differently than shown or described herein. Thus, the present invention is not limited to the embodiments set forth herein. Rather, these embodiments are provided so that this disclosure is thorough and complete and fully conveys the scope of the embodiments to those skilled in the art. Throughout the specification, reference to "an embodiment" or the like is not necessarily to only one embodiment, and different references to "an embodiment" or the like are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present.

Embodiments are described herein with reference to schematic and sectional illustrations of systems, devices, and intermediate structures. As such, variations from the shapes of the illustrations as a result, for example, of manufacturing techniques and/or tolerances, are to be expected. Thus, embodiments should not be construed as limited to the particular shapes of components or regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to identify various components, but they do not limit such components. Those terms are only used for the purpose of differentiating a component from other components having the same or similar names. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural form and vice versa. Furthermore, "include/comprise" or "including/comprising" used in the specification represents that one or more components, steps, operations, and/or elements exist or are added but any such term does not preclude the existence or addition of one or more other components, steps, operations, and/or elements.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a block diagram illustrating a memory system 1000 in accordance with an embodiment of the present disclosure.

Referring to FIG. 1, the memory system 1000 may include a memory device 1100, a controller 1200, and a buffer memory 1300. The memory device 1100 may include a plurality of semiconductor memories 100. The plurality of semiconductor memories 100 may be divided into a plurality of groups.

In FIG. 1, it is illustrated that the plurality of groups communicate with the controller 1200 through first to n-th channels CH1 to CHn, respectively. Each semiconductor memory 100 will be described in detail with reference to FIG. 3.

Each group may communicate with the controller 1200 through one common channel. The controller 1200 may control the plurality of semiconductor memories 100 of the memory device 1100 through the plurality of channels CH1 to CHn.

The controller 1200 is connected between a host 1400 and the memory device 1100. The controller 1200 may access the memory device 1100 in response to a command including a plurality of tasks received from the host 1400. For example, the controller 1200 may control a read operation, a write operation, an erase operation, and a background operation of the memory device 1100 in response to a command received from the host 1400. The controller 1200 may provide an interface between the memory device 1100 and the host 1400. The controller 1200 may run firmware for controlling the memory device 1100.

The controller 1200 controls the memory device 1100 to rearrange and queue the tasks received from the host 1400 based on the number and priority of tasks, and perform operations corresponding to the tasks according to a sequence of the queued tasks. Thereafter, additional tasks which are received from the host 1400 may be requeued along with the existing queued tasks based on priorities thereof. The controller 1200 may divide the plurality of tasks into a plurality of types and set different aging weights to tasks of different types, the aging weights corresponding to, or indicative or, starvation states of the tasks.

The types into which the plurality of tasks are divided primarily include read tasks corresponding to a read command, and write tasks corresponding to a write command. The read tasks may be further divided into a normal read task and a read reclaim task. The write tasks may be further divided into a normal write task and an urgent write task.

Each time a queued task is executed, the controller 1200 may accumulate or add an aging weight of the executed task to a starvation state determination value of each of the other queued tasks, and may determine that a queued task having an accumulated starvation state determination value of a set or predetermined value or more is an urgent task, so that the urgent task may be preferentially processed with respect to the other queued tasks. Accordingly, although new tasks having high priorities are consecutively queued and execution of the tasks generated prior to the new tasks is delayed, the delayed tasks may be determined to be urgent tasks after a predetermined execution time has passed, and the delayed tasks may be preferentially processed. Consequently, the delayed tasks may be prevented from being in a starvation state, whereby the memory system 1000 may be prevented from deteriorating in performance.

When a read operation is performed in response to a request from the host 1400, the buffer memory 1300 may temporarily store data read from the memory device 1100 and then output the data to the host 1400. When a write operation is performed, the buffer memory 1300 may temporarily store data received from the host 1400 and then output the data to the memory device 1100. In the embodiment shown in FIG. 1, the buffer memory 1300 is illustrated as being a component provided separately from the controller 1200. However, in another embodiment, the controller 1200 may include the buffer memory 1300.

The host 1400 may control the memory system 1000. The host 1400 may include a portable electronic device such as a computer, a personal digital assistant (PDA), a portable multimedia player (PMP), an MP3 player, a camera, a camcorder, or a mobile phone. The host 1400 may use a command to make a request for a write operation, a read operation, an erase operation, etc. of the memory system 1000.

The controller 1200 and the memory device 1100 may be integrated into a single semiconductor device. In an embodiment, the controller 1200 and the memory device 1100 may be integrated into a single semiconductor device to form a memory card such as a personal computer memory card international association (PCMCIA), a compact flash card (CF), a smart media card (SM or SMC), a memory stick multimedia card (MMC, RS-MMC, or MMCmicro), a SD card (SD, miniSD, microSD, or SDHC), or a universal flash storage (UFS).

The controller 1200 and the memory device 1100 may be integrated into a single semiconductor device to form a solid state drive (SSD), which may include a storage device configured to store data to a semiconductor memory. When the memory system 1000 is used as the SSD, the operating speed of the host 1400 coupled to the memory system 1000 may be phenomenally improved.

In an embodiment, the memory system 1000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the memory device 1100 or the memory system 1000 may be embedded in various types of packages. For example, the memory device 1100 or the memory system 1000 may be packaged as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

Figure 2:
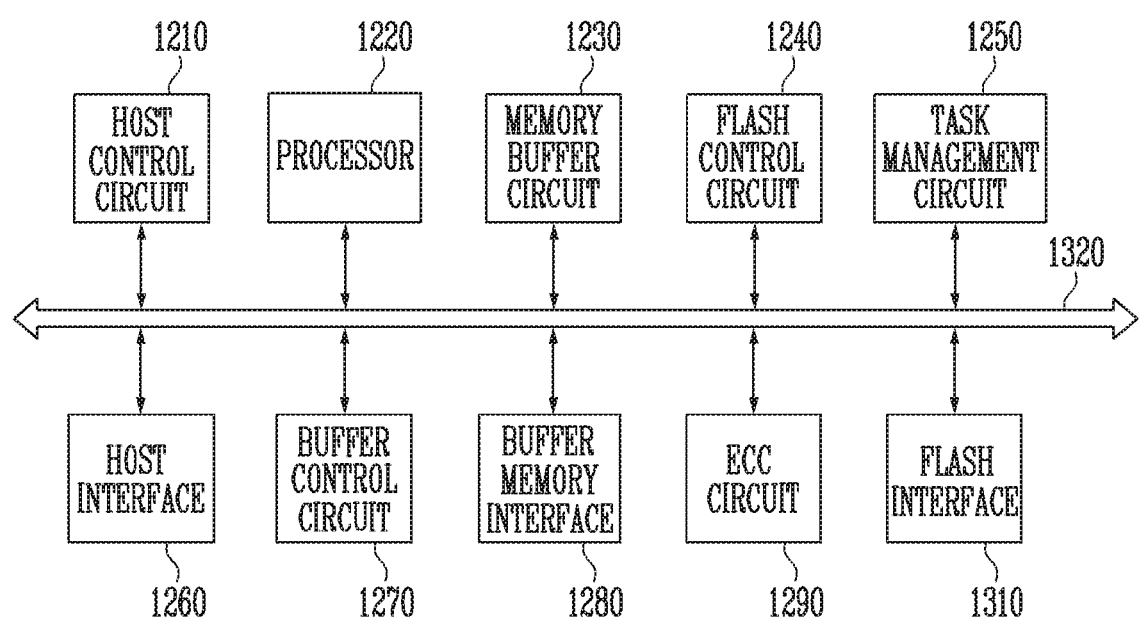
FIG. 2 is a block diagram illustrating a configuration of a controller of FIG. 1 in accordance with an embodiment of the present disclosure.

FIG. 2 is a diagram illustrating the controller 1200 of FIG. 1.

Referring to FIG. 2, the controller 1200 may include a host control circuit 1210, a processor 1220, a memory buffer circuit 1230, a flash control circuit 1240, a task management circuit 1250, a host interface 1260, a buffer control circuit 1270, a buffer memory interface 1280, an error correction code (ECC) circuit 1290, a flash interface 1310, and a bus 1320.

The bus 1320 may provide a channel between the components of the controller 1200.

The host control circuit 1210 may control data transmission between the host 1400 of FIG. 1, the host interface 1260, and a controller buffer memory, i.e., the memory buffer circuit 1230 or the buffer memory 1300 of FIG. 1. In an embodiment, the host control circuit 1210 may control an operation of buffering data input from the host 1400 to the memory buffer circuit 1230 or the buffer memory 1300 via the host interface 1260. In an embodiment, the host control circuit 1210 may control an operation of outputting data buffered to the memory buffer circuit 1230 or the buffer memory 1300 to the host 1400 via the host interface 1260.

The processor 1220 may control the overall operation of the controller 1200 and perform a logical operation. The processor 1220 may communicate with the host 1400 of FIG. 1 through the host interface 1260, and communicate with the memory device 1100 of FIG. 1 through the flash interface 1310. The processor 1220 may communicate with the buffer memory 1300 of FIG. 1 through the buffer memory interface 1280. The processor 1220 may control the memory buffer circuit 1230 through the buffer control circuit 1270. The processor 1220 may control the operation of the memory system 1000 by using the memory buffer circuit 1230 as an operation memory, a cache memory, or a buffer memory. When a command is received from the host 1400, the processor 1220 may rearrange a plurality of tasks included in the command based on the priorities thereof, and queue the rearranged tasks. Furthermore, the processor 1220 may divide the plurality of tasks into a plurality of types, i.e., into a normal read task, a read reclaim task, a normal write task, and an urgent write task, and apply different aging weights to the respective tasks starvation state values. The priority may be assigned by the host 1400, or may be assigned according to management policy of the controller 1200. When a new command is received from the host 1400, the processor 1220 may requeue the previously-queued tasks and a plurality of tasks included in the new command based on the priorities thereof. Furthermore, the processor 1220 may determine that a task determined to be in a starvation state by the task management circuit 1250 is an urgent task, and may requeue the tasks such that the urgent task becomes a highest priority task.

The memory buffer circuit 1230 may be used as an operation memory, a cache memory, or a buffer memory of the processor 1220. The memory buffer circuit 1230 may store codes and commands to be executed by the processor 1220. The memory buffer circuit 1230 may store data to be processed by the processor 1220. The memory buffer 1230 may include a static RAM (SRAM) or a dynamic RAM (DRAM). The memory buffer circuit 1230 may store a plurality of tasks queued by the processor 1220.

The flash control circuit 1240 may generate and output an internal command for controlling the memory device 1100 in response to the queued tasks. In an embodiment, in response to the normal write task, the flash control circuit 1240 may control an operation of transmitting and programming, to the memory device 1100, data buffered to the memory buffer circuit 1230 or the buffer memory 1300 of FIG. 1. In response to the normal read task, the flash control circuit 1240 may control a read operation of reading data stored in the memory device 1100 and storing the read data to the memory buffer circuit 1230 or the buffer memory 1300 of FIG. 1. In response to the read reclaim task, the flash control circuit 1240 may control a read reclaim operation of performing an error correction operation on the read data and storing the error-corrected data to another location of the memory device 1100. In response to the urgent write task, the flash control circuit 1240 may control a garbage collection operation of copying data stored in a memory block of the memory device 1100 to an arbitrary memory block. An execution-completed task may be removed by the flash control circuit 1240.

The task management circuit 1250 may manage starvation state determination values of the plurality of tasks queued by the processor 1220. When the starvation state determination value of a task is a predetermined value or more, the task management circuit 1250 may determine that such task is a starvation task. When a task which is currently executed by the flash control circuit 1240 is completed, the task management circuit 1250 may accumulate or add an aging weight assigned to the completed task to the starvation state determination value of each of the currently-queued tasks and update their starvation state determination values.

In an embodiment, the task management circuit 1250 may store the starvation state determination value of each task to the memory buffer circuit 1230 and manage the starvation state determination values.

In an embodiment, the task management circuit 1250 may be a component of the processor 1220, or may be a component of the flash control circuit 1240.

The host interface 1260 may communicate with the host 1400 of FIG. 1 under control of the processor 1220. The host interface 1260 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1270 may control the memory buffer circuit 1230 under control of the processor 1220.

The buffer memory interface 1280 may communicate with the buffer memory 1300 of FIG. 1 under control of the processor 1220. The buffer memory interface 1280 may communicate a command, an address, and data with the buffer memory 1300 through a channel.

The ECC circuit 1290 may perform error correction. The ECC circuit 1290 may perform ECC encoding based on data to be written to the memory device 1100 of FIG. 1 through the flash interface 1310. ECC encoded data may be transmitted to the memory device 1100 through the flash interface 1310. The ECC circuit 1290 may perform ECC decoding for data received from the memory device 1100 through the flash interface 1310. For example, the ECC circuit 1290 may be a component of the flash interface 1310.

The flash interface 1310 may communicate with the memory device 1100 of FIG. 1 under control of the processor 1220. The flash interface 1310 may communicate control signals, an address, and data with the memory device 1100 through channels. In the case where the memory device 1100 has successfully completed an operation or an error has occurred so the operation has failed, the flash interface 1310 may receive a corresponding report signal.

Figure 3:
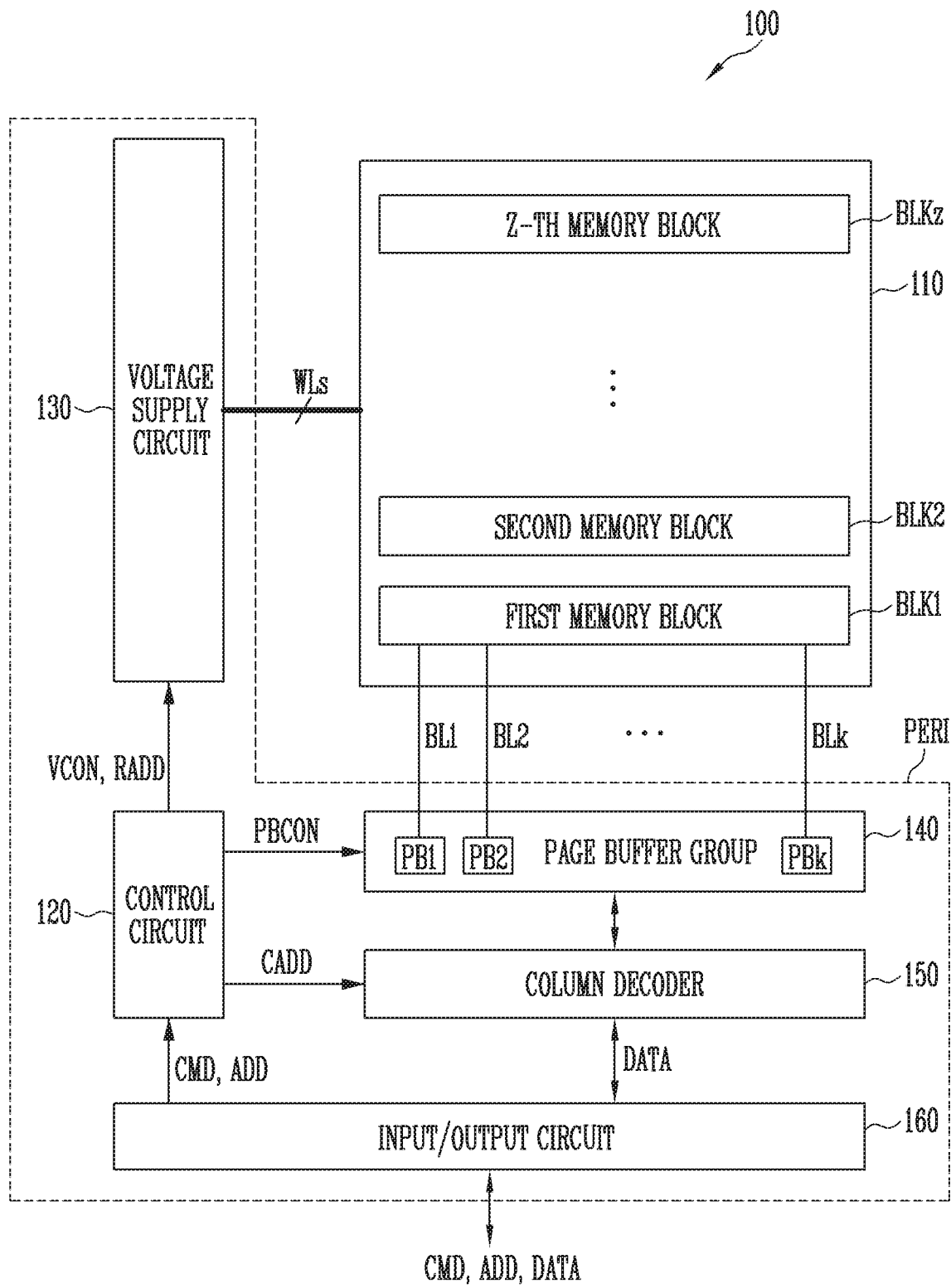
FIG. 3 is a block diagram illustrating a semiconductor memory of FIG. 1 in accordance with an embodiment of the present disclosure.

FIG. 3 is a block diagram illustrating the semiconductor memory 100 of FIG. 1 in accordance with an embodiment of the present disclosure.

Referring to FIG. 3, the semiconductor memory 100 may include a memory cell array 110 including a plurality of memory blocks BLK1 to BLKz, and a peripheral circuit PERI configured to perform a write operation, a read operation, or an erase operation on memory cells included in a selected page of the plurality of memory blocks BLK1 to BLKz. The peripheral circuit PERI may include a control circuit 120, a voltage supply circuit 130, a page buffer group 140, a column decoder 150, and an input/output circuit 160.

The memory cell array 110 may include the plurality of memory blocks BLK1 to BLKz. Each of the memory blocks BLK1 to BLKz may include a plurality of pages. Each of the plurality of pages may include a plurality of memory cells. In an embodiment, the plurality of memory cells may be nonvolatile memory cells. This will be described in more detail with reference to FIGS. 4 and 5.

The control circuit 120 may output a voltage control signal VCON for generating a voltage needed to perform a read operation, a write operation, or an erase operation in response to an internal command CMD input from an external device through the input/output circuit 160, and output a PB control signal PBCON for controlling page buffers PB1 to PBk in the page buffer group 140 depending on the type of operation. Furthermore, the control circuit 120 may output a row address signal RADD and a column address signal CADD in response to an address signal ADD input from the external device through the input/output circuit 160.

The voltage supply circuit 130 may supply operating voltages needed for a write operation, a read operation, and an erase operation of memory cells to local lines of the selected memory block including a drain select line, word lines WLs, and a source select line, in response to the voltage control signal VCON of the control circuit 120. The voltage supply circuit 130 may include a voltage generating circuit and a row decoder.

The voltage generating circuit may output the operating voltages needed for the write operation, the read operation, and the erase operation of the memory cells to global lines, in response to the voltage control signal VCON of the control circuit 120.

The row decoder may couple, in response to row address signals RADD of the control circuit 120, the global lines to the local lines such that the operating voltages output from the voltage generating circuit to the global lines may be transmitted to the local lines of the selected memory block in the memory cell array 110.

The page buffer group 140 may include a plurality of page buffers PB1 to PBk coupled with the memory cell array 110 through bit lines BL1 to BLk. In response to a PB control signal PBCON of the control circuit 120, the page buffers PB1 to PBk of the page buffer group 140 may selectively precharge the bit lines BL1 to BLk depending on input data to be stored to the memory cells, or may sense voltages of the bit lines BL1 to BLk so as to read out data from the memory cells.

The column decoder 150 may select the page buffers PB1 to PBk in the page buffer group 140 in response to a column address signal CADD output from the control circuit 120. In other words, the column decoder 150 may successively transmit data DATA to be stored to the memory cells, to the page buffers PB1 to PBk in response to the column address signal CADD. Furthermore, during a read operation, the column decoder 150 may successively select the page buffers PB1 to PBk in response to a column address signal CADD such that data DATA of memory cells latched to the page buffers PB1 to PBk may be output to the external device.

During a write operation, the input/output circuit 160 may transmit input data DATA to be stored to the memory cells, to the column decoder 150, under control of the control circuit 120 so that the data DATA may be input to the page buffer group 140. When the column decoder 150 transmits the data DATA transmitted from the input/output circuit 160 to the page buffers PB1 to PBk they may store the input data DATA to internal latch circuits thereof. During a read operation, the input/output circuit 160 may output, to the external device, data DATA transmitted from the page buffers PB1 to PBk of the page buffer group 140 through the column decoder 150.

Figure 4:
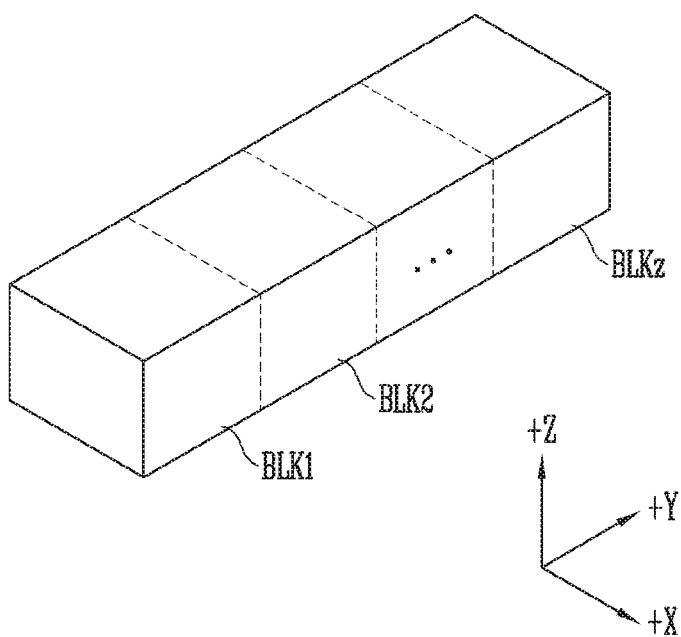
FIG. 4 is a block diagram illustrating a memory cell array of FIG. 3 in accordance with an embodiment of the present disclosure.

FIG. 4 is a block diagram illustrating the memory cell array 110 of FIG. 3 in accordance with an embodiment of the present disclosure.

Referring to FIG. 4, the memory cell array 110 may include a plurality of memory blocks BLK1 to BLKz. Each memory block has a three-dimensional structure. Each memory block may include a plurality of memory cells stacked on a substrate. The memory cells are arranged in a +X direction, a +Y direction, and a +Z direction. The structure of each memory block will be described in more detail with reference to FIG. 5.

Figure 5:
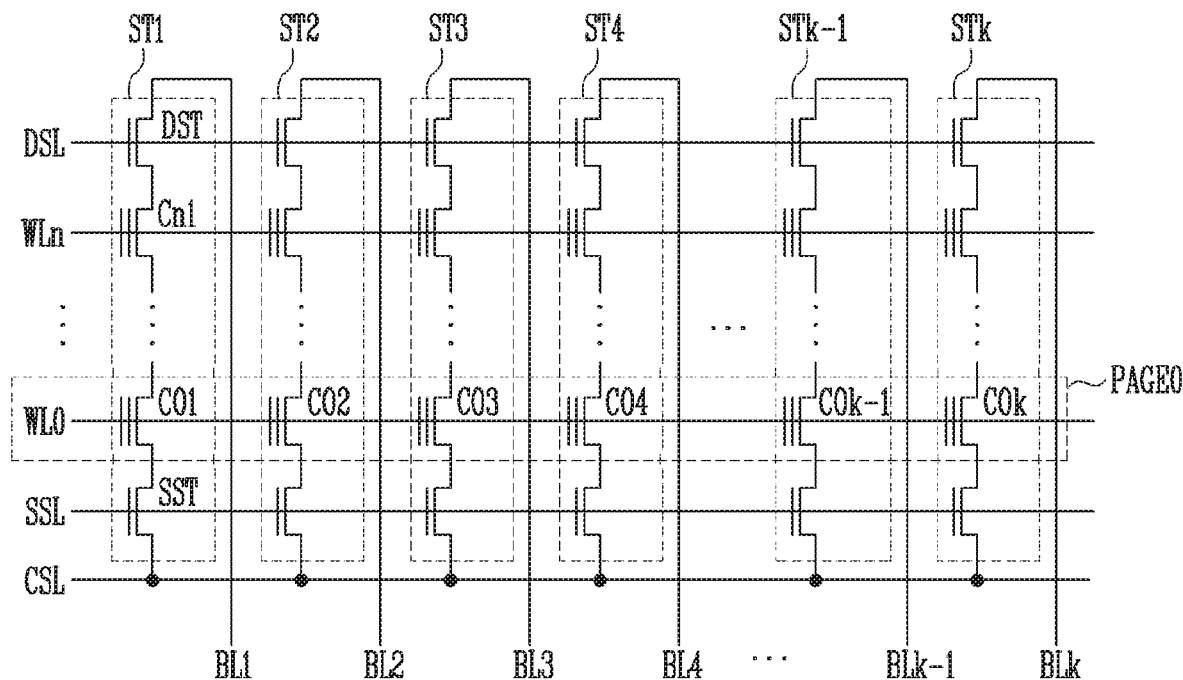
FIG. 5 is a circuit diagram illustrating a memory block shown in FIG. 4 in accordance with an embodiment of the present disclosure.

FIG. 5 is a circuit diagram illustrating a memory block shown in FIG. 4, in accordance with an embodiment of the present disclosure.

Referring to FIG. 5, each memory block may include a plurality of strings ST1 to STk coupled between the bit lines BL1 to BLk and a common source line CSL. In other words, the strings ST1 to STk may be respectively coupled with the corresponding bit lines BL1 to BLk and coupled in common with the common source line CSL. Each string, e.g., ST1, may include a source select transistor SST having a source coupled to the common source line CSL, a plurality of memory cells C01 to Cn1, and a drain select transistor DST having a drain coupled to the bit line BL1. The memory cells C01 to Cn1 may be coupled in series between the select transistors SST and DST. A gate of the source select transistor SST may be coupled to the source select line SSL. Gates of the memory cells C01 to Cn1 may be respectively coupled to the word lines WL0 to WLn. A gate of the drain select transistor DST may be coupled to the drain select line DSL.

The memory cells in the memory block may be divided on a physical page basis or on a logical page basis. For example, memory cells C01 to C0k coupled to a single word line (e.g., WL0) may form a single physical page PAGE0. Each of the pages may be the basic unit of a program operation or a read operation.

Figure 6:
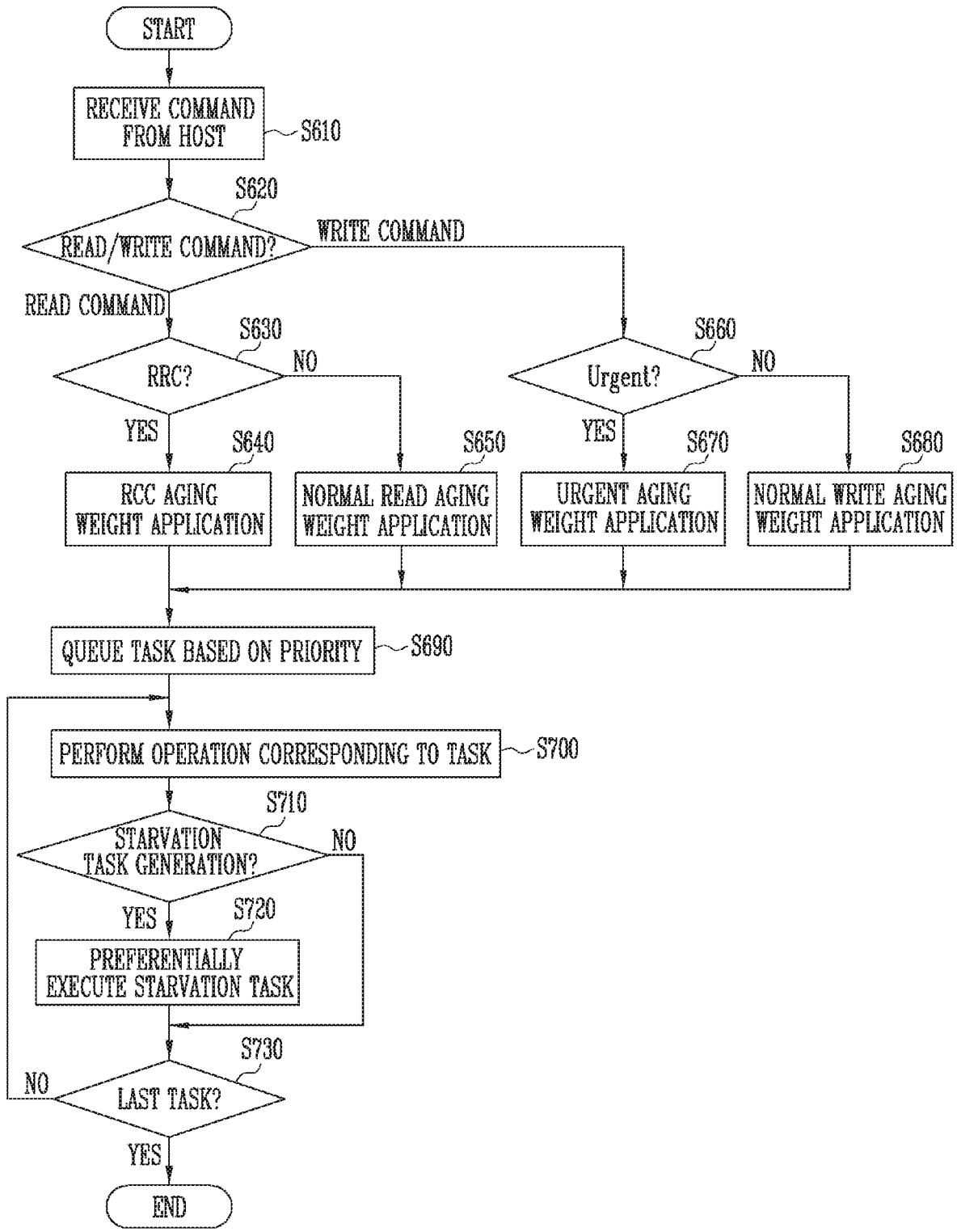
FIG. 6 is a flowchart illustrating operation of a memory system in accordance with an embodiment of the present disclosure.

FIG. 6 is a flowchart illustrating operation of the memory system in accordance with an embodiment of the present disclosure.

The operation of the memory system in accordance with an embodiment of the present disclosure will be described with reference to FIGS. 1 to 6.

If a command is received from the host 1400 at step S610, the processor 1220 of the controller 1200 determines at step S620 whether the received command is a read command or a write command.

When the received command is a read command ("READ COMMAND" at step S620), a plurality of tasks in the received command are determined to be read tasks, and it is determined at step S630 whether each such task is a read reclaim type RRC.

When the read task is determined as a read reclaim type RRC ("YES" at step S630), an aging weight of the corresponding read reclaim task is assigned at step S640 based on a read count value corresponding to the size of data to be processed by the read reclaim task, in other words, corresponding to a task size of the corresponding read reclaim task.

When the read task is determined as a normal read type ("NO" at step S630), an aging weight of the corresponding normal read task is assigned at step S650 based on a read count value corresponding to a task size of the corresponding normal read task.

Table 1 is provided to explain queued read tasks entering the starvation state based on read counts.

TABLE 1

| Task size | Task type | Read count (RRC) | Read count (normal) |
|---|---|---|---|
| task size ≥ 512 KB | Read | 10 | 125 |
| task size ≥ 256 KB | Read | 21 | 125 |
| task size ≥ 128 KB | Read | 32 | 125 |
| task size ≥ 64 KB | Read | 64 | 125 |
| task size ≥ 32 KB | Read | 64 | 250 |
| task size ≥ 16 KB | Read | 64 | 500 |
| task size ≥ 8 KB | Read | 64 | 1000 |
| task size < 8 KB | Read | 64 | 2000 |

Referring to Table 1, as the task size increases, the read count at which the queued tasks may enter the starvation state is reduced. Furthermore, in the case of the read reclaim operation RRC, the read count at which the queued tasks enter the starvation state is less than that of the normal read operation.

For example, when a read reclaim task having a task size of 512 kilo byte (KB) or more is performed 10 times (i.e., when the read count thereof is 10), tasks queued prior to the performed read reclaim task may enter the starvation state. When a normal read task having a task size of less than 8 KB is performed 2000 times (i.e., when the read count thereof is 2000), tasks queued prior to the performed normal read task may enter the starvation state.

Based on Table 1, an aging weight may be assigned to a corresponding task. If a predetermined value at which the task is determined to be in the starvation state is set to 1, the aging weight may be 1/read count. For example, in the case of a read reclaim task having a task size of 512 KB or more, the aging weight to be assigned is $1/10$. In the case of a read reclaim task having a task size of less than 512 KB and 256 KB or more, the aging weight to be assigned is $1/21$. In the case of a read reclaim task having a task size of less than 256 KB and 128 KB or more, the aging weight to be assigned is $1/32$. In the case of a normal read task having a task size of 512 KB or more, the aging weight to be assigned is $1/125$. In the case of a normal read task having a task size of less than 64 KB and 32 KB or more, the aging weight to be assigned is $1/250$. In the case of a normal read task having a task size of less than 8 KB, the aging weight to be assigned is $1/2000$.

When the received command is a write command ("WRITE COMMAND" at step S620), a plurality of tasks included in the received command are determined to be write tasks, and it is determined whether each task is determined as an urgent type Urgent, at step S660.

If the write task is determined as an urgent type ("YES" at step S660) in which an urgent operation such as a garbage collection operation must be performed, an aging weight of the corresponding urgent write task is assigned based on a write count value corresponding to the size of data to be processed by the urgent write task, i.e., corresponding to the task size of the corresponding urgent write task, at step S670.

When the write task is determined as a normal type ("NO" at step S660), an aging weight of the corresponding normal write task is assigned based on a write count value corresponding to a task size of the corresponding normal write task at step S680.

Table 2 is provided to explain queued write tasks entering the starvation state based on write counts.

TABLE 2

| Task size | Task type | Write count (Urgent) | Write count (normal) |
|---|---|---|---|
| task size ≥ 512 KB | Write | 10 | 64 |
| task size ≥ 256 KB | Write | 21 | 64 |
| task size ≥ 128 KB | Write | 32 | 64 |
| task size < 128 KB | Write | 64 | 64 |

Referring to Table 2, in the case of the urgent write task, as the task size increases, the write count at which the queued tasks may enter the starvation state is reduced. Furthermore, in the case of the normal write task, the queued tasks may enter the starvation state at a constant write count regardless of the task size. By comparing Tables 1 and 2, it can be seen that the value of the write count at which the queued tasks may enter the starvation state is less than that of the read count. In addition, in the case of an urgent write task (for example, a garbage collection operation), the write count at which the queued tasks may enter the starvation state is less than that of the normal write task.

For example, when an urgent write task having a task size of 512 kilo byte (KB) or more is performed 10 times (i.e., when the write count thereof is 10), tasks queued prior to the performed urgent write task may enter the starvation state. When a normal write task having a task size of less than 8 KB is performed 64 times (i.e., when the write count thereof is 64), tasks queued prior to the performed normal write task may enter the starvation state.

Based on Table 2, an aging weight may be assigned to a corresponding task. If a predetermined value at which the corresponding task is determined to be in the starvation state is set to 1, the aging weight may be 1/write count. For example, in the case of an urgent write task having a task size of 512 KB or more, the aging weight to be assigned is 1/10. In the case of an urgent write task having a task size of less than 512 KB and 256 KB or more, the aging weight to be assigned is 1/21. In the case of an urgent write task having a task size of less than 256 KB and 128 KB or more, the aging weight to be assigned is 1/32. In the case of an urgent write task having a task size of less than 128 KB, the aging weight to be assigned is 1/64. Furthermore, in the case of the normal write task, the aging weight to be assigned is 1/64 regardless of the task size.

The processor 1220 rearranges and queues a plurality of tasks included in a received command based on the number and priority of tasks, at step S690.

The flash control circuit 1240 generates and outputs an internal command for controlling the memory device 1100 according to a sequence of the queued tasks. The memory device 1100 performs an operation corresponding to a task, e.g., a normal read operation, a read reclaim operation, a normal write operation, or an urgent operation such as a garbage collection operation, in response to the internal command, at step S700.

If the operation corresponding to the task is completed, the task management circuit 1250 accumulates the aging weight of the performed task to the starvation state determination value of each of the queued tasks that have not yet been executed, thus updating the starvation state determination values of the queued tasks that have not yet been executed. The task that has been completed may be removed.

The task management circuit 1250 determines at step S710 whether there is a task, among the queued tasks, which has entered the starvation state. Such task is referred to as a starvation task, which means its accumulated starvation state determination value is a predetermined value (e.g., 1) or more.

The processor 1220 determines that the task determined to be a starvation task is an urgent task, and requeues the tasks so that the starvation task is performed as a first priority. The flash control circuit 1240 executes the urgent task in preference to the other tasks at step S720.

When the performed task is a last task ("YES" at step S730), the process is terminated. If residual or remaining queued tasks are present, a subsequent task is selected, and the process is reperformed from step S700.

Figure 7:
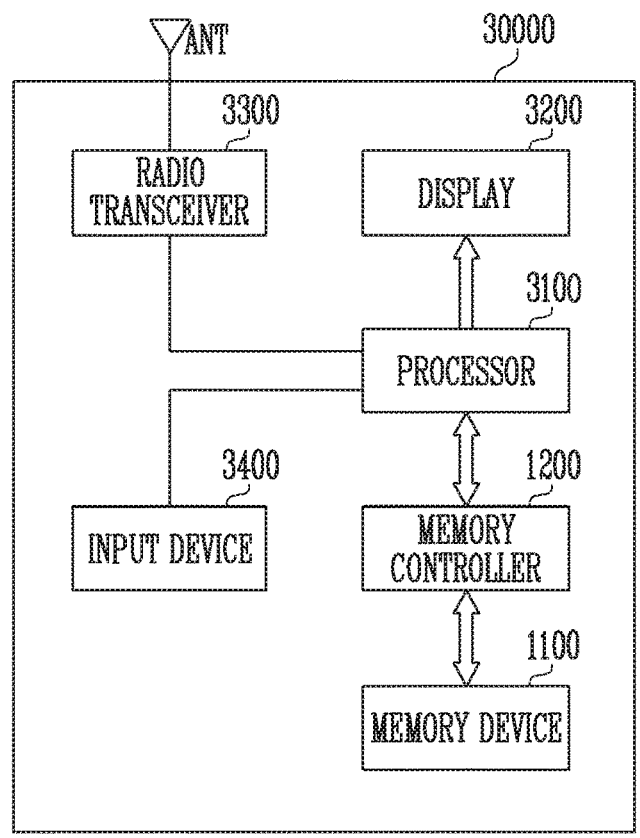
FIG. 7 is a diagram illustrating a memory system in accordance with an embodiment of the present disclosure.

FIG. 7 is a diagram illustrating a memory system 30000 in accordance with an embodiment of the present disclosure.

Referring to FIG. 7, the memory system 30000 may be embodied in a cellular phone, a smartphone, a tablet PC, a personal digital assistant (PDA) or a wireless communication device. The memory system 30000 may include a memory device 1100, and a memory controller 1200 configured to control the operation of the memory device 1100. The memory controller 1200 may control a data access operation, e.g., a program operation, an erase operation, or a read operation, of the memory device 1100 under control of a processor 3100.

Data programmed in the memory device 1100 may be output through a display 3200 under control of the memory controller 1200.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal output from the radio transceiver 3300 and transmit the processed signal to the memory controller 1200 or the display 3200. The memory controller 1200 may program a signal processed by the processor 3100 to the memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data output from the memory controller 1200, data output from the radio transceiver 3300, or data output form the input device 3400 is output through the display 3200.

In an embodiment, the memory controller 1200 capable of controlling the operation of the memory device 1100 may be embodied as a part of the processor 3100 or a chip provided separately from the processor 3100. The memory controller 1200 may be implemented using the example of the controller shown in FIG. 2.

Figure 8:
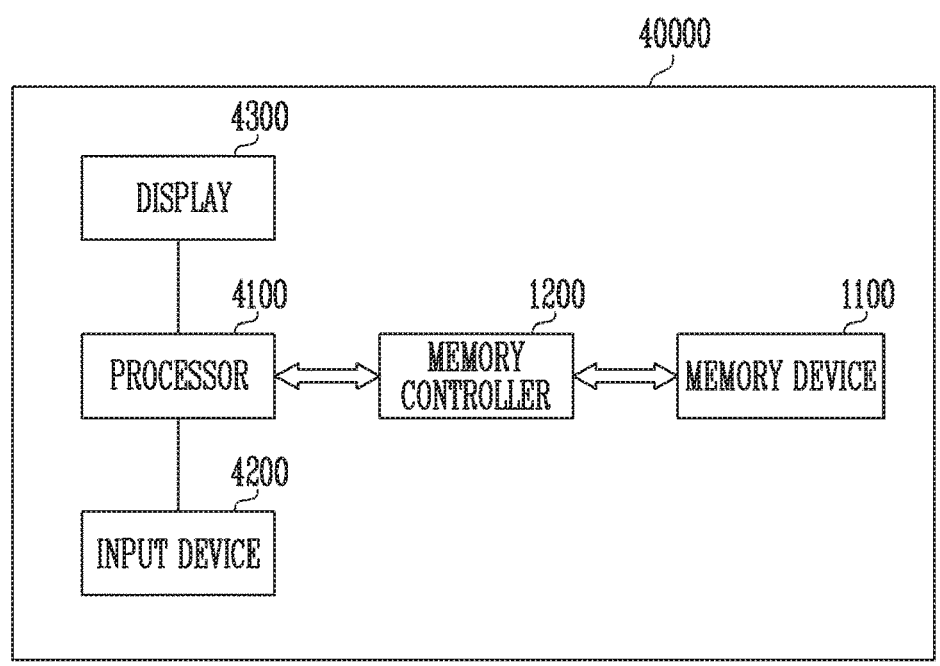
FIG. 8 is a diagram illustrating a memory system in accordance with an embodiment of the present disclosure.

FIG. 8 is a diagram illustrating a memory system 40000 in accordance with an embodiment of the present disclosure.

Referring to FIG. 8, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 1100, and a memory controller 1200 configured to control the data processing operation of the memory device 1100.

A processor 4100 may output data stored in the memory device 1100 through a display 4300, according to data input from an input device 4200. For example, the input device 4200 may be embodied in a pointing device such as a touch pad or a computer mouse, a keypad, or a keyboard.

The processor 4100 may control the overall operation of the memory system 40000 and control the operation of the memory controller 1200. In an embodiment, the memory controller 1200 capable of controlling the operation of the memory device 1100 may be embodied as a part of the processor 4100 or a chip provided separately from the processor 4100. The memory controller 1200 may be implemented using the example of the controller shown in FIG. 2.

Figure 9:
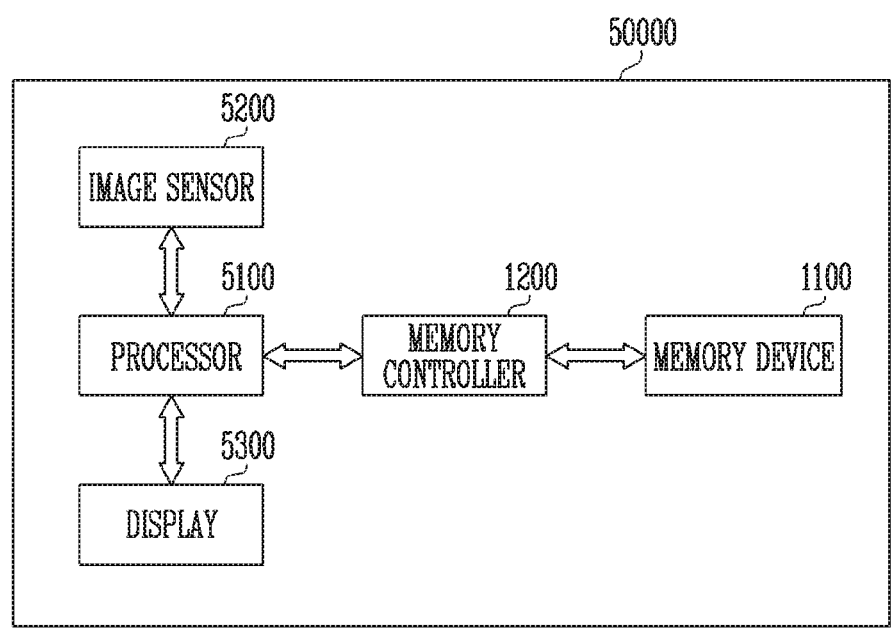
FIG. 9 is a diagram illustrating a memory system in accordance with an embodiment of the present disclosure.

FIG. 9 is a diagram illustrating a memory system 50000 in accordance with an embodiment of the present disclosure.

Referring to FIG. 9, the memory system 50000 may be embodied in an image processing device, e.g., a digital camera, a portable phone provided with a digital camera, a smartphone provided with a digital camera, or a tablet PC provided with a digital camera.

The memory system 50000 may include the memory device 1100, and a memory controller 1200 capable of controlling a data processing operation, e.g., a program operation, an erase operation, or a read operation, of the memory device 1100.

An image sensor 5200 of the memory system 50000 may convert an optical image into digital signals. The converted digital signals may be transmitted to a processor 5100 or the memory controller 1200. Under control of the processor 5100, the converted digital signals may be output through a display 5300 or stored to the memory device 1100 through the memory controller 1200. Data stored in the memory device 1100 may be output through the display 5300 under control of the processor 5100 or the memory controller 1200.

In an embodiment, the memory controller 1200 capable of controlling the operation of the memory device 1100 may be embodied as a part of the processor 5100 or a chip provided separately from the processor 5100. The memory controller 1200 may be implemented using the example of the controller shown in FIG. 2.

Figure 10:
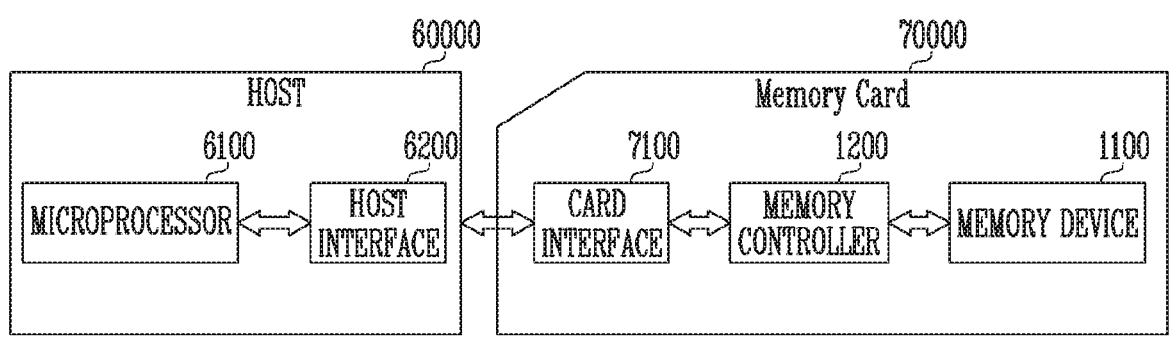
FIG. 10 is a diagram illustrating a memory system in accordance with an embodiment of the present disclosure.

FIG. 10 is a diagram illustrating a memory system 70000 in accordance with an embodiment of the present disclosure.

Referring to FIG. 10, the memory system 70000 may be embodied in a memory card or a smart card. The memory system 70000 may include the memory device 1100, a memory controller 1200, and a card interface 7100.

The controller 1200 may control data exchange between the memory device 1100 and the card interface 7100. In an embodiment, the card interface 7100 may be a secure digital (SD) card interface or a multi-media card (MMC) interface, but it is not limited thereto. The memory controller 1200 may be implemented using the example of the controller 1200 shown in FIG. 2.

The card interface 7100 may interface data exchange between a host 60000 and the memory controller 1200 according to a protocol of the host 60000. In an embodiment, the card interface 7100 may support a universal serial bus (USB) protocol, and an interchip (IC)-USB protocol. Here, the card interface may refer to hardware capable of supporting a protocol which is used by the host 60000, software installed in the hardware, or a signal transmission scheme.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the memory controller 1200 under control of a microprocessor 6100.

In accordance with embodiments of the present disclosure, a plurality of tasks received from a host are divided into types, e.g., read task and a write task, and aging weights for starvation states of the read task and the write task are set to different values. The aging weights of executed tasks are added to residual tasks, so that a task having an urgent state is detected and processed. Thereby, the tasks may be prevented from being in the starvation states.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
    a memory device configured to perform read operations and write operations; and
    a controller configured to control the memory device such that a plurality of tasks received from a host are queued based on priorities of the tasks, and the read operations or the write operations corresponding to the tasks are executed according to a sequence of the queued tasks,
    wherein the controller divides the plurality of tasks into a plurality of types, assigns different aging weights to the queued tasks depending on the respective types, accumulates an aging weight of an executed task of the queued tasks to a starvation state determination value of each of residual tasks of the queued tasks, and determines whether each of the residual tasks is in a starvation state using the corresponding starvation state determination value.

2. The memory system according to claim 1, wherein the controller comprises:
    a processor configured to queue the plurality of tasks based on the priorities of the tasks;
    a flash control circuit configured to control the memory device to sequentially execute the queued tasks; and
    a task management circuit configured to accumulate the aging weight of a task completed by the flash controller to the starvation state determination value of each of the residual tasks of the queued tasks.

3. The memory system according to claim 2, wherein the processor divides the plurality of tasks into read tasks and write tasks and assigns different aging weights to the read tasks and the write tasks.

4. The memory system according to claim 3, wherein the processor divides the read tasks into a normal read task and a read reclaim task and assigns different aging weights to the normal read task and the read reclaim task.

5. The memory system according to claim 4, wherein the aging weight assigned to the normal read task is less than the aging weight assigned to the read reclaim task.

6. The memory system according to claim 4, wherein the processor divides the write tasks into a normal write task and an urgent write task and assigns different aging weights to the normal write task and the urgent write task.

7. The memory system according to claim 6, wherein the aging weight assigned to the normal write task is less than the aging weight assigned to the urgent write task.

8. The memory system according to claim 7, wherein the aging weight assigned to the normal read task is less than the aging weight assigned to the normal write task.

9. The memory system according to claim 4, wherein, as task sizes of the read tasks increase, the aging weights assigned are increased.

10. The memory system according to claim 6, wherein, as a task size of the urgent write task increases, the aging weight assigned is increased.

11. The memory system according to claim 2,
wherein the task management circuit determines that a task, among the residual tasks, the starvation state determination value of which is equal to or greater than a predetermined value, is a starvation task, and
wherein the processor determines the starvation task to be an urgent task, and requeues the tasks.

12. A method of operating a memory system, comprising:
receiving a command from a host;
determining whether the command is a read command or a write command, and assigning, depending on whether the command is a read command or a write command, a corresponding aging weight to a plurality of tasks in the command;
queuing the plurality of tasks based on priorities of the tasks, and sequentially performing operations corresponding to the plurality of tasks according to a sequence of the queued tasks;
accumulating, when an operation corresponding to one of the plurality of tasks is completed, an aging weight corresponding to the one task to a starvation state determination value of each of residual tasks of the queued tasks; and
determining that a task, the accumulated starvation state determination value of which is detected to be a predetermined value or more, is an urgent task, and executing the urgent task.

13. The method according to claim 12, wherein, when the command is the read command, the plurality of tasks in the command are divided into a normal read task and a read reclaim task, and different aging weights are assigned to the normal read task and the read reclaim task.

14. The method according to claim 13, wherein the aging weight assigned to the normal read task is less than the aging weight assigned to the read reclaim task.

15. The method according to claim 12, wherein, as a task size of the normal read task or the read reclaim task increases, the aging weight assigned thereto is increased.

16. The method according to claim 12, wherein, when the command is the write command, the plurality of tasks in the command are divided into a normal write task and an urgent write task, and different aging weights are assigned to the normal write task and the urgent write task.

17. The method according to claim 16, wherein the aging weight assigned to the normal write task is less than the aging weight assigned to the urgent write task.

18. The method according to claim 16, wherein, as a task size of the normal write task increases, the aging weight assigned thereto is increased.

19. The method according to claim 16, wherein the aging weight assigned to the normal write task is greater than the aging weight assigned to the normal read task.

20. A memory system comprising:
a memory device;
a controller configured to:
rearrange and queue a plurality of tasks according to priorities thereof, the tasks having aging weights according to types thereof;
control the memory device to perform operations according to the queued tasks; and
accumulate the aging weight of a task, among the plurality of tasks, for which a corresponding operation is completed, to each remaining queued task,
wherein the controller controls the memory device to perform an operation corresponding to a task, among the remaining queued tasks, that has an accumulated aging weight greater than a threshold.

* * * * *